(12) United States Patent
Doan Huu

(10) Patent No.: US 12,293,320 B2
(45) Date of Patent: May 6, 2025

(54) TIME-SERIES ANOMALY PREDICTION AND ALERT

(71) Applicant: BUSINESS OBJECTS SOFTWARE LTD., Dublin (IE)

(72) Inventor: Jacques Doan Huu, Montigny le Bretonneux (FR)

(73) Assignee: BUSINESS OBJECTS SOFTWARE LTD., Dublin (IE)

(*) Notice: Subject to any disclaimer, the term of this patent is extended or adjusted under 35 U.S.C. 154(b) by 165 days.

(21) Appl. No.: 17/231,057

(22) Filed: Apr. 15, 2021

(65) Prior Publication Data

US 2022/0335347 A1    Oct. 20, 2022

(51) Int. Cl.

| | |
|---|---|
| *G06F 17/15* | (2006.01) |
| *G06F 18/2433* | (2023.01) |
| *G06N 20/00* | (2019.01) |
| *G06Q 10/04* | (2023.01) |
| *G06Q 10/0635* | (2023.01) |
| *G06Q 10/067* | (2023.01) |

(52) U.S. Cl.
CPC ......... *G06Q 10/0635* (2013.01); *G06F 17/15* (2013.01); *G06F 18/2433* (2023.01); *G06N 20/00* (2019.01); *G06Q 10/04* (2013.01); *G06Q 10/067* (2013.01)

(58) Field of Classification Search
CPC .. G06Q 10/04; G06Q 10/0635; G06Q 10/067; G06F 17/15; G06F 17/18; G06K 9/6284; G06N 20/00

See application file for complete search history.

(56) References Cited

U.S. PATENT DOCUMENTS

| | | | | |
|---|---|---|---|---|
| 9,727,533 | B2 * | 8/2017 | Thibaux | G06F 17/18 |
| 10,576,224 | B2 * | 3/2020 | Lellouche | A61M 16/021 |
| 10,628,252 | B2 * | 4/2020 | Wang | G06K 9/6284 |
| 10,635,563 | B2 * | 4/2020 | Salunke | G06F 11/3034 |

(Continued)

FOREIGN PATENT DOCUMENTS

| | | | | |
|---|---|---|---|---|
| EP | | 4075306 A1 * | 10/2022 | G06F 11/079 |
| WO | WO-2017050113 A1 * | | 3/2017 | H04L 41/0631 |

OTHER PUBLICATIONS

Zhao, Hang; Multivariate Time-series Anomaly Detection via Graph Attention Network, Nov. 1, 2020, IEEE Xplore, pp. 841-850 (Year: 2020).*

(Continued)

*Primary Examiner* — Dylan C White
(74) *Attorney, Agent, or Firm* — Buckley, Maschoff & Talwalkar LLC

(57) ABSTRACT

Provided is a system and method which can identify a causal relationship for anomalies in a time-series signal based on co-occurring and preceding anomalies in another time-series signal. In one example, the method may include identifying a recurring anomaly within a time-series signal of a first data value, determining a time-series signal of a second data value that is a cause of the recurring anomaly in the time-series signal of the first data value based on a preceding and co-occurring anomaly in the time-series signal of the second data value, and storing a correlation between the preceding and co-occurring anomaly in the time-series signal of the second data value and the recurring anomaly in the time-series signal of the first data value.

20 Claims, 8 Drawing Sheets

(56) References Cited

U.S. PATENT DOCUMENTS

| | | | | |
|---|---|---|---|---|
| 10,757,125 | B2* | 8/2020 | Wakasugi | G06T 7/12 |
| 10,771,488 | B2* | 9/2020 | Verma | G06N 5/022 |
| 11,061,393 | B2* | 7/2021 | Abe | H04L 41/0631 |
| 11,082,439 | B2* | 8/2021 | Salunke | G06F 11/3447 |
| 11,275,639 | B2* | 3/2022 | Wang | G06F 11/0775 |
| 11,620,528 | B2* | 4/2023 | Ryan | G06N 3/045 |
| | | | | 709/224 |
| 11,645,293 | B2* | 5/2023 | Pelloin | G06F 18/2433 |
| | | | | 706/11 |
| 2010/0119226 | A1* | 5/2010 | Rasras | G02B 6/12007 |
| | | | | 398/45 |
| 2012/0316835 | A1* | 12/2012 | Maeda | G06F 18/21375 |
| | | | | 702/183 |
| 2013/0046721 | A1* | 2/2013 | Jiang | G06N 7/01 |
| | | | | 706/47 |
| 2018/0329769 | A1* | 11/2018 | Sun | G16H 50/20 |
| 2019/0362245 | A1* | 11/2019 | Buda | G06N 3/08 |
| 2019/0373007 | A1* | 12/2019 | Salunke | G06F 11/3447 |
| 2019/0373143 | A1* | 12/2019 | Overmann | H04N 23/56 |
| 2020/0149998 | A1* | 5/2020 | Ayyagari | G06N 3/088 |
| 2020/0183946 | A1* | 6/2020 | Pelloin | G06F 17/18 |
| 2020/0337648 | A1* | 10/2020 | Saripalli | G16H 15/00 |
| 2020/0387797 | A1* | 12/2020 | Ryan | G06N 3/084 |
| 2021/0081170 | A1 | 3/2021 | Agrawal et al. | |
| 2021/0224383 | A1* | 7/2021 | Mizoguchi | G06F 21/54 |
| 2021/0320939 | A1* | 10/2021 | Salunke | G06F 11/3423 |
| 2021/0406671 | A1* | 12/2021 | Gasthaus | G06F 11/2263 |
| 2022/0198264 | A1* | 6/2022 | Guo | G06N 3/08 |
| 2022/0335347 | A1* | 10/2022 | Doan Huu | G06N 20/00 |
| 2022/0382857 | A1* | 12/2022 | Liu | G06F 21/552 |
| 2022/0411094 | A1* | 12/2022 | Dillard | G06T 11/206 |
| 2023/0085991 | A1* | 3/2023 | Liebman | G05B 23/0259 |
| | | | | 700/79 |
| 2023/0237044 | A1* | 7/2023 | Parthasarathy | G06N 20/00 |
| | | | | 707/690 |

OTHER PUBLICATIONS

Choi, Kukjin; Deep Learning for Anomaly Detection in Time-Series Data: Review, Analysis, Guidelines, Aug. 26, 2021, IEEE Access, pp. 120043-120065 (Year: 2021).*

A European Search Report dated Apr. 4, 2022 which was issued in connection with EP21203605.7.

* cited by examiner

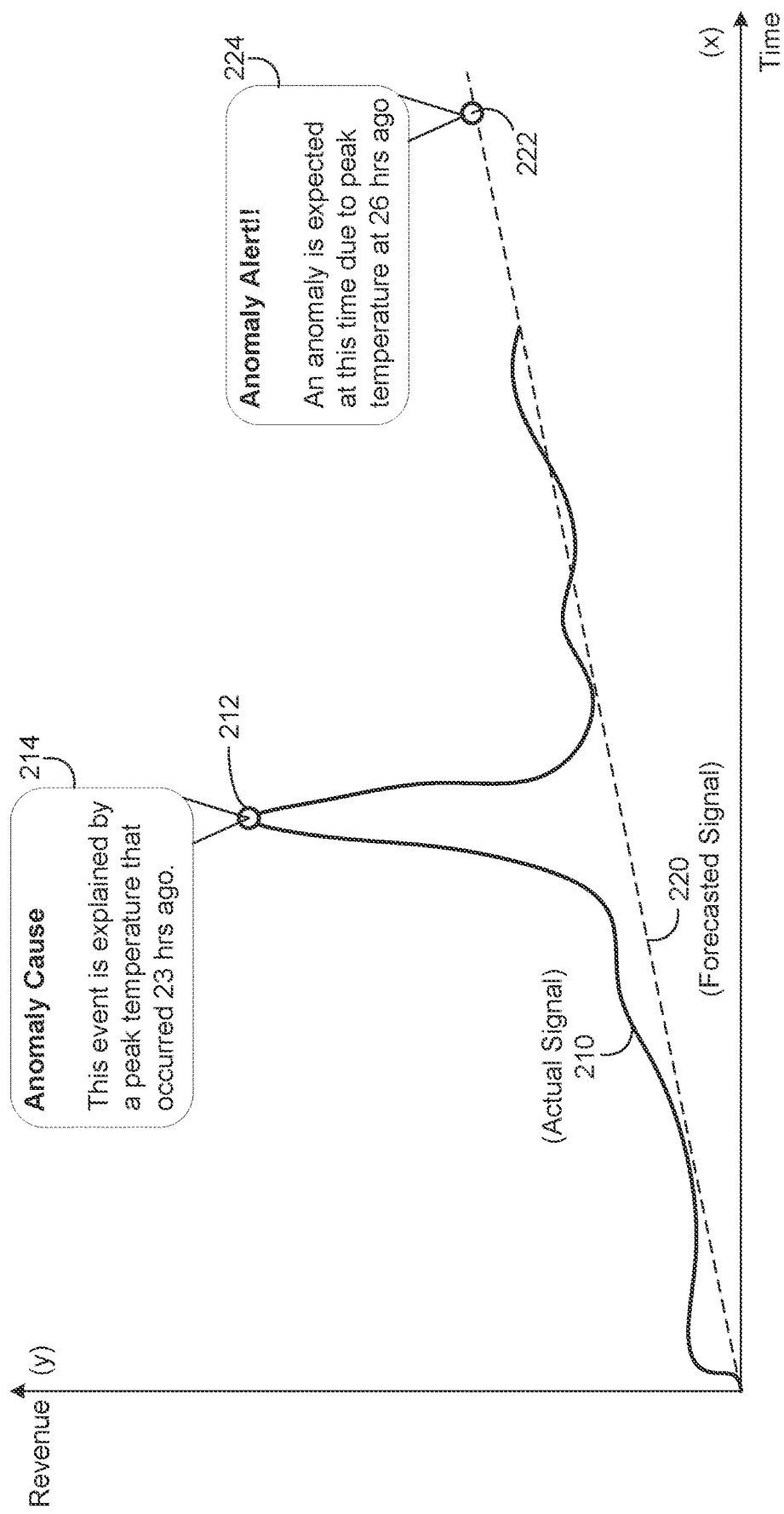

| | $T_1$ | $T_2$ | $T_3$ | $T_4$ | $T_5$ | $T_6$ | $T_7$ | $T_8$ | $T_9$ | $T_{10}$ | $T_{11}$ | $T_{12}$ | $T_{13}$ | $T_{14}$ | $T_{15}$ | $T_{16}$ |
|---|---|---|---|---|---|---|---|---|---|---|---|---|---|---|---|---|
| Signal 310 | | | | $A_1$ | | | | | $A_1$ | | | | | | $A_1$ | |
| Signal 320 | | $A_2$ | | | | | $A_2$ | | | | | | $A_2$ | | | |
| Signal 330 | | | $A_3$ | | | | | $A_3$ | | | | | | | | |

340 → $T_1$; 342 → $A_3$ (Causal Model)

TIME-SERIES ANOMALY PREDICTION AND ALERT

BACKGROUND

Time-series data contains sequential data points (e.g., data values) that are observed at successive time durations (e.g., hourly, daily, weekly, monthly, annually, etc.). For example, monthly rainfall, daily stock prices, annual sales revenue, etc., are examples of time-series data. Forecasting is a machine learning process which can be used to observe historical values of time-series data and predict future values of the time-series data. A predicted time-series value may be graphed as a plurality of data points over time and displayed on a user interface for an analyst or other user to visualize and possibly take actions according to the prediction.

In time-series data, an anomaly (also referred to as an outlier) is a data point (single instance or a few instances) which significantly differs in value from values of a normal pattern of data. Causes of anomalies often include unexpected changes to the data or the conditions surrounding the data. For example, a break down of a machine, an unexpected rise in temperature, an unexpected weather event, etc. However, because anomalies are typically unexpected, it can be difficult to determine "when" an anomaly is likely to occur.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 2 is a diagram illustrating an output of a forecasted time-series signal with an anomaly alert in accordance with an example embodiment.

FIG. 3B is a diagram illustrating a data structure with anomaly data of the plurality of time-series signals compared to each other in accordance with an example embodiment.

Figure 1:
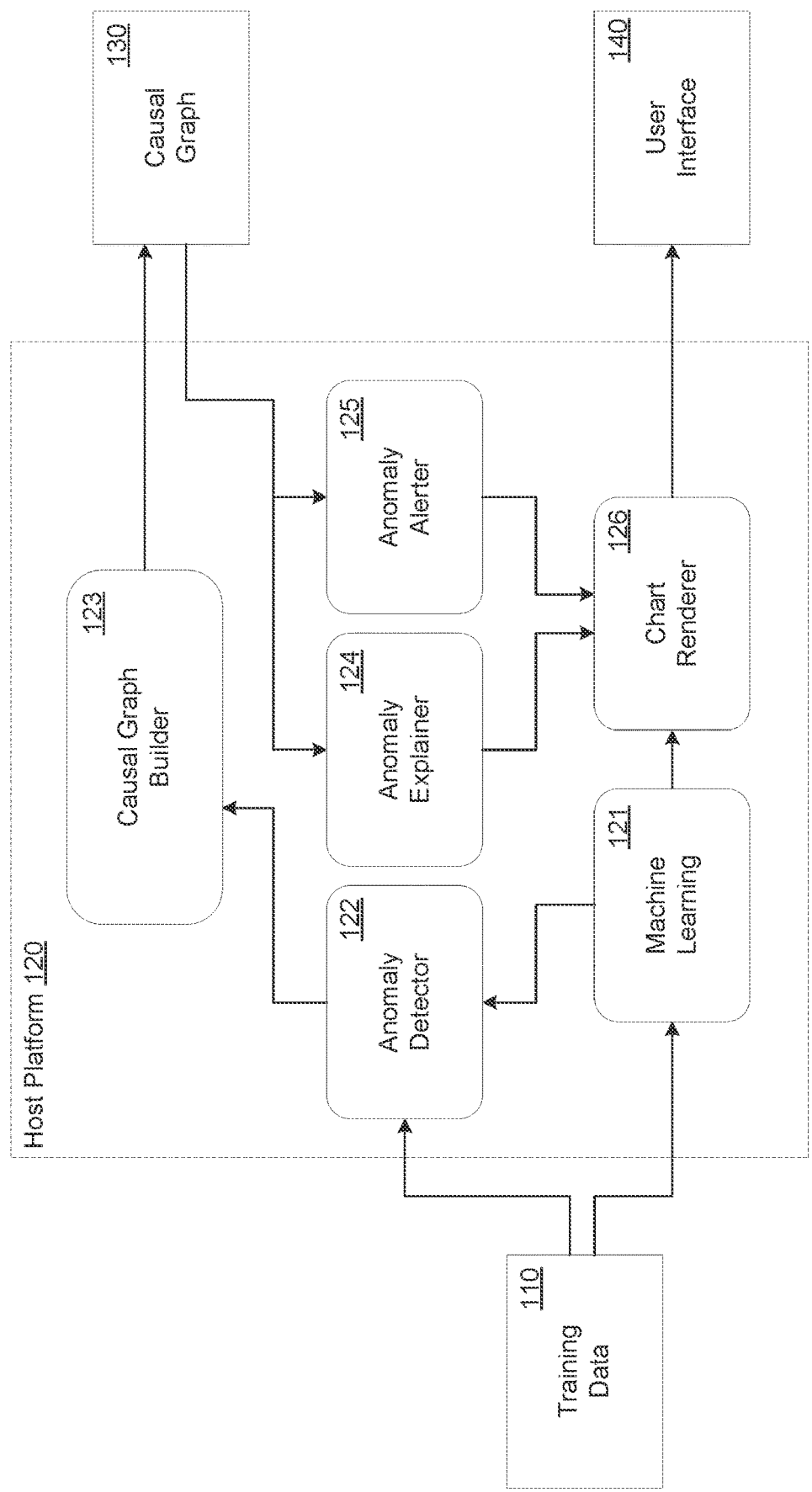
FIG. 1 is a diagram illustrating an architecture of an anomaly alerting system in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Time-series forecasting models are machine learning models that are used to predict a single set of values of an item (e.g., cost, quantity, amount, intensity, etc.) recorded over equal time increments (e.g., minutes, days, hours, weeks, years, etc.) The models may support data properties that are frequently found in business applications such as trends, seasonality, fluctuations, residuals, and time dependence. Model features may be trained based on available historical data. The trained model can then be used to forecast future values for the data. Some examples of time-series forecasting models include exponential smoothing (ETS) and autoregressive integrated moving average (ARIMA) just to name a few.

Most time-series forecasting models are univariate and attempt to learn a dynamically changing time-series signal over time. To train the model, a series of simulations of the model (machine learning algorithm) are executed on training data (historically measured data values). The result is a model that can predict the normal output of the data pattern in the future. Anomalies are often encountered in the training data. Anomalies are irregular data points that are significantly different in value from a normal pattern or trend of the time-series signal. Anomalies can be the result of exogenous factors that are unpredictable and unexpected. When anomalies are encountered within the training data, these irregularities are often prevented from being used to train the model in order to prevent the model from being skewed by abnormal and unexpected behavior.

The example embodiments are directed to a new system that is capable of determining when an anomaly is likely to occur in the future, and outputting a warning to a screen, application, etc., prior to the occurrence of the anomaly. The predictive system acts as an early warning system for anomalies that enables a viewer/analyst to take mitigating actions in advance of the occurrence of the anomaly to either prevent the anomaly or better handle the anomaly when it occurs. In the example embodiments, a predictive model (or models) can be used to identify patterns of events in other time-series signals that contribute or otherwise cause anomalies in a target time-series signal. As a simple example, the sales of ice cream in the month of July may usually be high due to the warm weather. An anomaly may occur (sharp sales drop) when there is an unusually cold period of time (e.g., 3 or more days) for that time of year. Thus, anomalies in a time-series signal for temperature can have a causal relationship for anomalies in a time-series signal for ice cream sales revenue.

The predictive system described herein identifies a causal relationship of a target time-series signal by cross-examining anomalies (or other events) that are co-occurring in other time-series signals. For example, a first time-series signal that represents shipping delays over time may be determined as a cause for anomalies in a second time-series signal that represents gas prices over time. In this example, an anomaly within the gas prices such as a sharp increase in price can be caused by co-occurring and preceding anomalies in shipping delays (e.g., lost time at sea, etc.). That is, the anomaly in the second time-series signal is caused (at least partially) by a preceding and co-occurring anomaly in the first time-series signal.

The predictive system described herein can identify this causal relationship between time-series signals based on various attributes such as frequency of co-occurrence of the respective anomalies, average delay between the respective anomalies, and the like. The predictive system can generate a model (e.g., a causal model or causal graph) which stores the relationship between the anomalies in the first time-series signal and the anomalies in the second time-series signal. The causal model can then be used by the predictive system to predict a future occurrence of an anomaly in the second time-series signal based on live data being measured in the first time-series signal. Furthermore, based on the average delay, the causal model can predict "when" the anomaly is expected to occur in the future.

Time-series analysis (TSA) is dedicated to capturing signal regularity over time as learned from historical analysis of the signal. However, TSA fails to model abnormal events within a target signal, which are referred to herein as anomalies. Anomalies are usually unexpected and are not a result of the dynamic features of the signal such as trend, seasonality/cyclical, residual, etc. aspects of the signal. Instead, the anomalies are often the consequence of anomalies in other signals (e.g., data values) that are related to the signal of interest. For example, an anomaly in cabin pressure of an airplane may be the result in an anomaly in a cooling system of the airplane in combination with an anomaly in the altitude of the airplane. Tying these anomalies together has been difficult. Moreover, identify future occurrences of such anomalies is difficult.

The example embodiments use a predictive system as further described in the example of FIG. 1 to predict a future occurrence of an anomaly. In particular, the predictive system can identify a correlation between anomalies in a target signal that are the result of anomalies (or other signal change events) in one or more other time-series signals. The target signal typically has an anomaly that co-occurs at the same frequency as the anomaly in the one or more other time-series signals, and that has a delay that is consistent (e.g., the anomaly in the target signal happens after a specific period of time after the anomaly in the one or more other time-series signals.) Thus, the anomaly in the one or more other time-series signals precede the anomaly in the time-series signal and co-occur at a similar frequency, and with a same delay in between.

In addition, the predictive system can identify a causal explanation for the cause of an anomaly in a target time-series signal (e.g., a signal of interest). The explanation may describe the other time-series signal, when it occurred, and why it is considered the cause of the anomaly in the target signal. In addition, the predictive system can output a warning/alert to a user interface that provides notification of the upcoming anomaly. For example, the warning can be displayed along a graph of a forecast (future value) of the target time-series signal. In some embodiments, the causal analysis may identify a single time-series signal that is the cause of anomalies in a target time-series signal. As another example, the causal analysis may identify a plurality of time-series signals that are the cause of anomalies in the target time-series signal.

FIG. 1 illustrates an architecture of an anomaly alerting system 100 in accordance with an example embodiment. FIG. 2 illustrates an output of a forecasted time-series signal with an anomaly alert which may be output by the anomaly alerting system 100 in FIG. 1, in accordance with an example embodiment. Referring to FIG. 1, the system 100 includes a host platform 120 such as a cloud platform, a database, a web server, an on-premises server, a user device, a combination of devices, and the like.

In the example of FIG. 1, the host platform 120 includes a machine learning module 121 that can train a time-series forecasting model (e.g., via iterative executions on training data 110), and execute the trained time-series forecasting model to make predictions on future values of a timer-series value. In the example embodiments, there is no limit to the type of time-series forecasting model or the type of data that can be used. Data types include sales, revenue, price, pressure, vibration, temperature, and the like. The host platform 120 also includes an anomaly detector 122 that identifies anomalies within a time-series signal output by the time-series forecasting model of the machine learning module 121. Here, the anomaly detector 122 may identify outliers or other irregularities in a time-series signal based on differences in value of the anomalous data point and non-anomalous data points that have a regularity that is usually captured by standard time series modeling techniques. For example, a data point that has a value that exceeds an average of the most recent ten (10) data points by a predetermined threshold, may be considered an anomaly, but embodiments are not limited thereto. Any known anomaly detection process can be used.

Figure 3A:
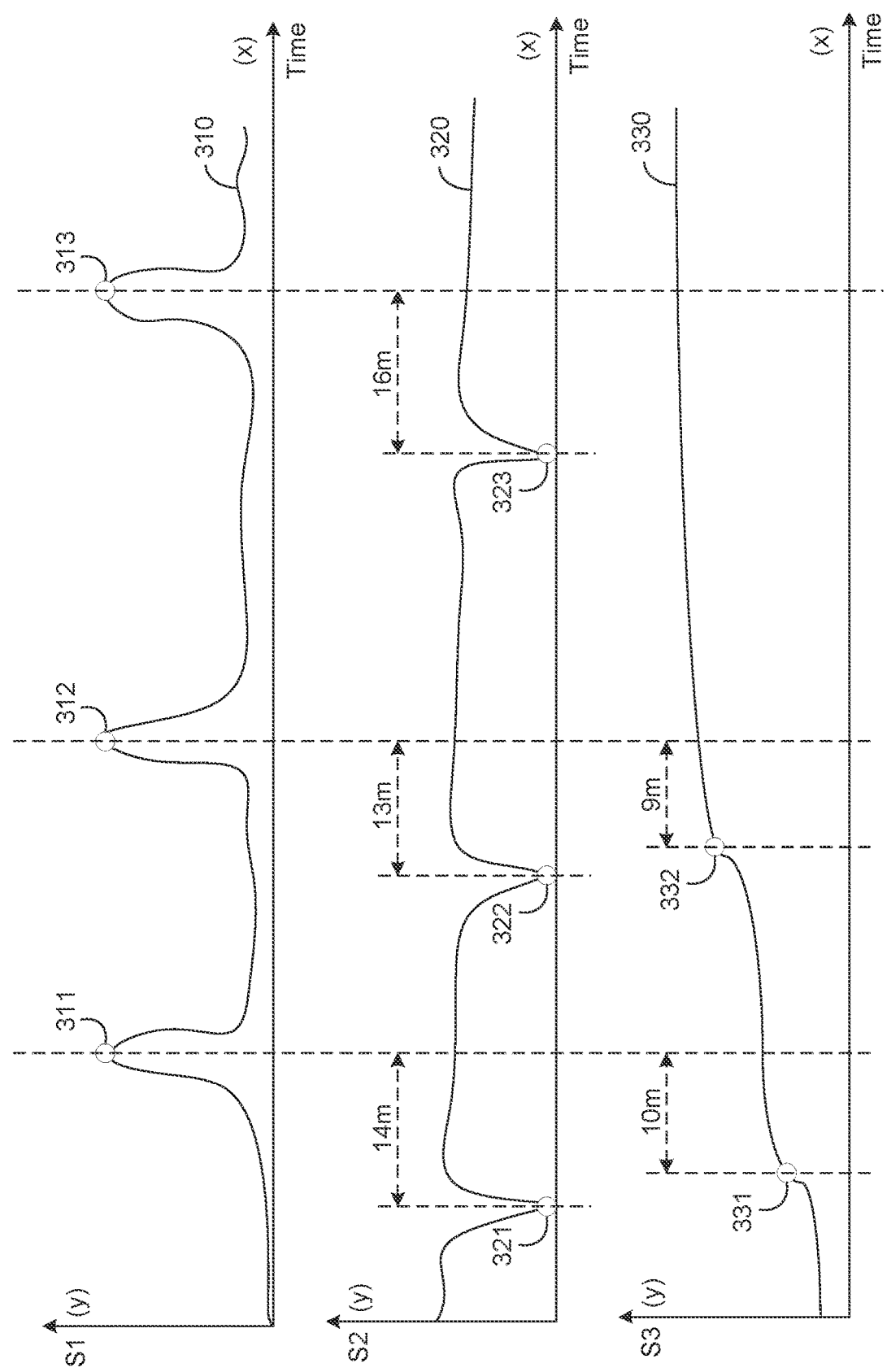
FIG. 3A is a diagram illustrating graphs of a plurality of time-series signals in accordance with an example embodiment.
Figure 3C:
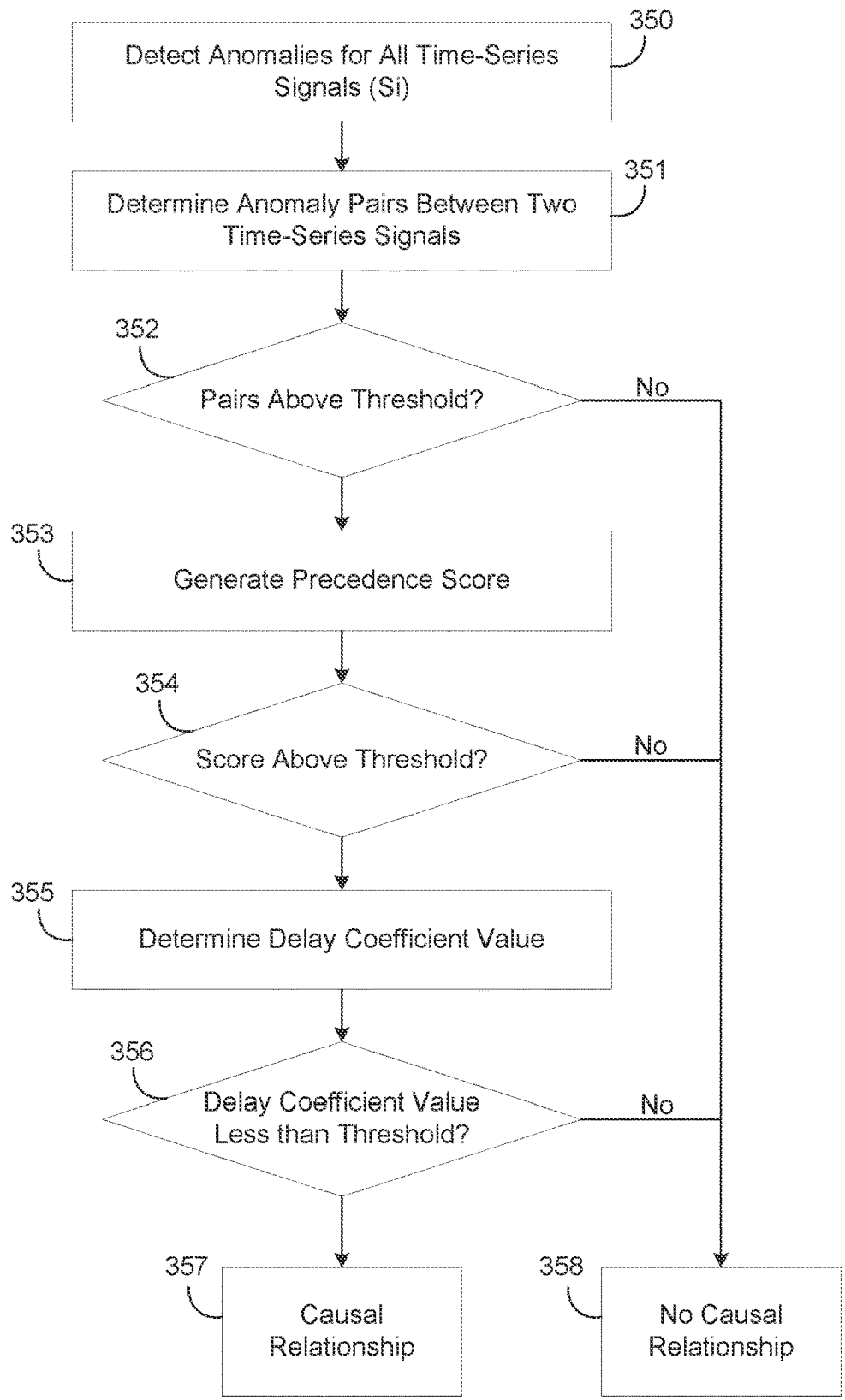
FIG. 3C is a diagram illustrating a process of determining whether a time-series signal is a cause of an anomaly in another time-series signal in accordance with an example embodiment.
Figure 4:
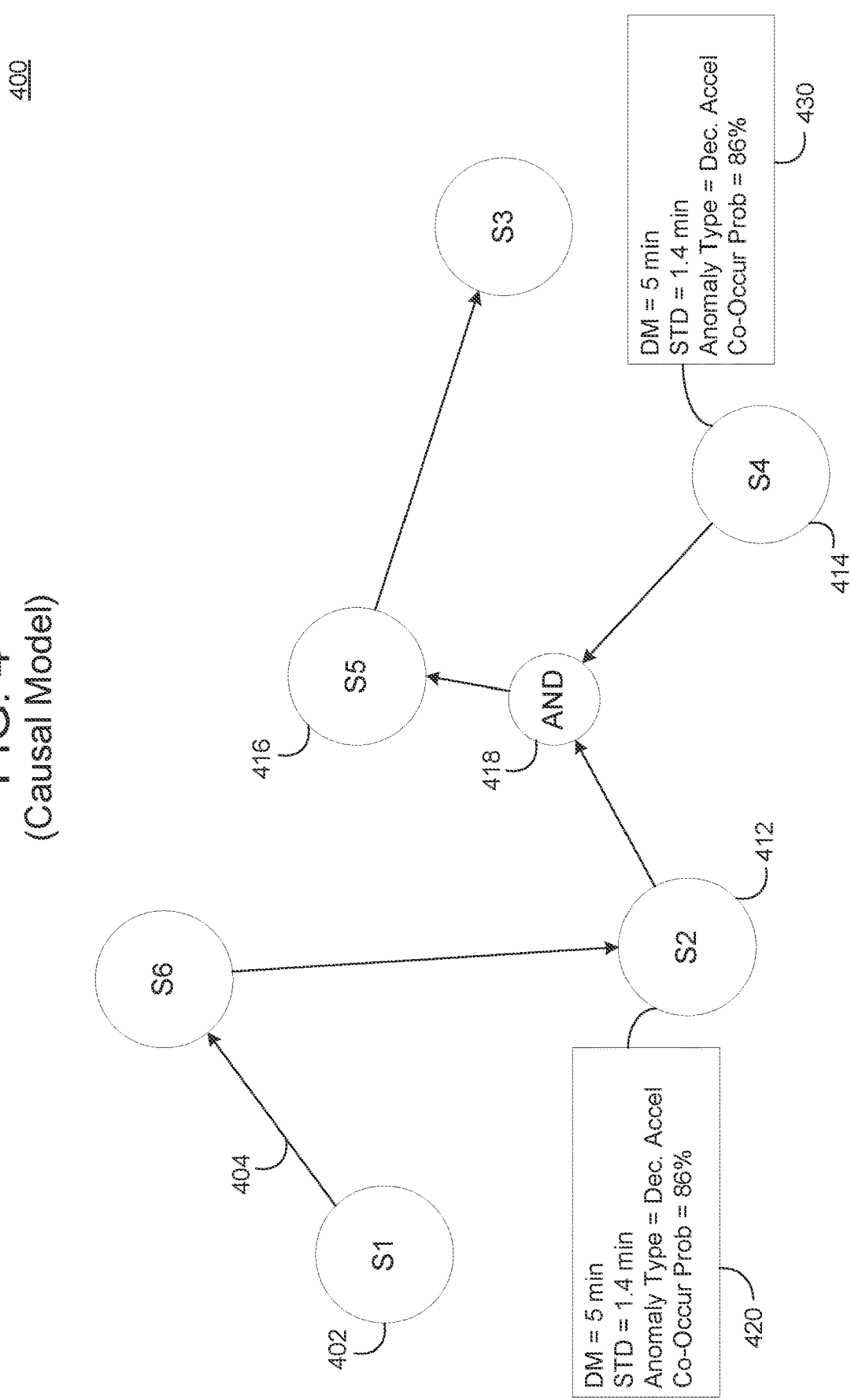
FIG. 4 is a diagram illustrating a causal model identifying anomaly relationships among time-series signals in accordance with example embodiments.

The host platform 120 also includes a causal graph builder 123 that can cross-examine different time-series signals to identify time-series signals that contribute/cause anomalies in other time-series signals. These causal relationships may be stored in a causal graph 130 which may include a model, graph, etc., as shown in the example of FIG. 4. The causal graph 130 may be used by the host platform 120 to analyze incoming time-series data of a signal of interest (and other time-series signals having causal relationships therewith) to detect when a future anomaly is going to occur in the time-series signal of interest. FIGS. 3A-3C provide examples of a process for identifying causal relationships and building the causal graph shown in FIG. 4.

The host platform 120 also includes an anomaly explainer 124 that can extract information from the causal graph about past anomalies which can be used to provide an textual explanation on the past anomalies which occur consistently after other past anomalies from different time series. The past anomaly information may be embedded within the causal graph or it may be stored separate (e.g., in a table, array, document, object, etc.). The host platform 120 also includes an anomaly alerter 125 which can receive a forecasted time-series signal from the machine learning module 121, predicts future anomalies in a time-series signal of interest based on co-occurring and preceding anomalies (or other events) in other time-series signals as identified in the causal graph, and outputs the alert to a user interface such as shown in FIG. 2.

The host platform 120 also includes a chart renderer 126 which may receive data from the machine learning module 121, the anomaly explainer 124, and the anomaly alerter 125, and render a visualization (e.g., a user interface 140) which includes a graph or other chart of the time-series signal of interest along with a warning or early alert of an upcoming future anomaly as detected by the anomaly alerter 125. The graph of the time-series signal of interest may also include an explanation of a previous anomaly as well as details of the previous anomaly, and a variable or parameter within a co-occurring time-series signal that is a contributor/cause of the anomaly in the time-series signal of interest. Each of the modules (machine learning module 121, anomaly detector 122, causal graph builder 123, anomaly explainer 124, anomaly alerter 125, and the chart renderer 126, may be executed and performed by a processing device (e.g., one or more hardware processors) implemented within the host platform 120.

FIG. 2 illustrates a non-limiting example of the user interface 140 that may be output by the chart renderer 126 of FIG. 1. Referring to FIG. 2, a graph is shown which includes a graph of sales revenue as it changes over time. In particular, an actual revenue signal 210 is measured from data that has already happened, and a forecasted revenue signal 220 is predicted from previous revenue data. The user interface 140 shows a comparison of the actual revenue signal 210 versus the forecasted revenue signal 220. In this example, an anomaly occurs at point 212 in the actual revenue signal 210. This anomaly 212 represents the most-recent occurring anomaly in the actual revenue signal 21. Here, the predictive system (e.g., the modules of the host platform 120) determines that the cause of the anomaly 212 is an event (e.g., an anomaly) in another time-series signal (temperature) which is not shown. The chart renderer 126 may display information about the anomaly in window 214. Here, the window 214 may include a description of the anomaly, an identifier of the causal time-series signal, an identifier of the event that occurred in the causal time-series signal, a time that elapsed between the anomaly in the causal time-series signal and the timer-series signal of interest, and the like.

The user interface 140 also includes a predicted anomaly 222. Here, the anomaly alerter 125 may detect that the future anomaly 222 is likely to occur due to the presence of other factual anomalies from different time series in the near past. In this example, the change in temperature that is correlated to the anomaly in sales revenue has been detected by the host platform 120. Accordingly, the host platform 120 also determines that an anomaly in the sales revenue (previously correlated with the anomaly in temperature) is likely to occur as well. The host platform 120 can also predict "when" the anomaly will occur based on a delay that is measured from previous occurrence between anomaly pairs in the two time-series signals as further described in the example of FIG. 3B. The charter renderer 126 may output a window 224 which includes an alert of the expected future anomaly along with an explanation of why the anomaly is predicted including information about the co-occurring and preceding anomaly in the correlated causal time-series signal.

In the example embodiments, anomalies in a target signal are determined to be caused by anomalies or other signal change events in a different time-series signal or signals. The predictive system described herein may receive many time-series signals that temporally occur together. The predictive system may cross-analyze the different signals to identify a time-series signal that causes anomalies in another time series-signal. One of the indicators that can be used to identify this causal correlation is the delayed co-occurrence frequency of anomalies in the target signal and the anomalies in the causal signal. The co-occurrence frequency can be used to build a causal graph. This causal graph can then be used to predict the occurrence of future anomalies with the co-occurring anomaly is detected in the causal signal.

FIG. 3A illustrates graphs 300A of a plurality of time-series signals in accordance with an example embodiment. Here, a first data value is represented by a time-series signal 310, a second data value is represented by a time-series signal 320, and a third data value is represented by a time-series signal 330. The data values may be any kind of data values such as temperature, pressure, acceleration, distance, velocity, sales, revenue, profits, price, units, and the like. In this example, the time-series signal 310 is the target signal of interest, while the system attempts to determine whether either or both of the time-series signals 320 and 330 are causes for anomalies in the time-series signal 310.

In FIG. 3A, the time-series signal 310 includes three anomalies 311, 312, and 313. For example, the anomalies 311-313 may be identified by the anomaly detector 122 described in FIG. 1. Likewise, the time-series signal 320 includes three anomalies 321, 322, and 323. Meanwhile, the time-series signal 330 includes two anomalies 331 and 332. The system can pair together anomalies within the different time-series signals. For example, anomaly 311 and anomaly 321 can be paired together. Likewise, anomaly 311 and anomaly 331 can be paired together. The pairings may be based on the period of time in which the anomalies occur and the amount of times each anomaly co-occurs.

Each anomaly may be identified if it does not fit an a priori distribution. For example, if a linear regression fits globally well on time series points of the signal with only a few of the points being "far" from this line, the few are qualified as anomalies. Here, each point may be compared against a predetermined threshold distance between the point and the line to determine whether the point is far enough from the line to be considered an anomaly. The abrupt and local variation may be identified by applying a simple differencing on the signal to detect the anomalies (outliers). The anomaly detector 122 may also provide a data record with each anomaly such as a series ID, a time point on the graph, an anomaly type, and the like. The anomalies and their data may be stored in a memory and accessed for cross-comparison with anomalies in other time-series signals.

The graphs 300A further identify a delay value (amount of time) between when the anomalies in the time-series signal 320 occur and when paired anomalies in the time-series signal 310 co-occur. Likewise, a delay value also occurs between when the anomalies in the time-series signal 330 occur and when paired anomalies in the time-series signal 310 occur. For example, the delay that occurs between occurrence of anomaly 321 and occurrence of anomaly 311 is 14 minutes. The delay that occurs between occurrence of anomaly 331 and anomaly 311 is 10 minutes. Both frequency of co-occurrence and delay statistics can be used to determine a causal relationship.

FIG. 3B illustrates a data structure 300B with anomaly data of the plurality of time-series signals compared to each other in accordance with an example embodiment. The data structure 300B may be a table, an array, a document, a spreadsheet, a file, or the like. The data structure 300B includes a plurality of columns a plurality of rows where columns represent points in time and rows represent signals. The cells 340 in the data structure 300B can be labeled by the predictive system with anomalies 343 based on the occurrence of the anomalies in the signals. In this example, signal 310 includes three anomalies (corresponding to 311, 312, and 313 in FIG. 3A) and they occur at times T4, T9, and T15. Meanwhile, the signal 320 includes anomalies that occur at T2, T7, and T13. Furthermore, the signal 330 includes anomalies that occur at times T3 and T8.

FIG. 3C illustrates a process 300C of determining whether a time-series signal is a cause of an anomaly in another time-series signal in accordance with an example embodiment. For example, the process 300C may be performed by a system such as a software application, a computing device, a cloud platform, a database, a combination thereof, and the like. In this example, three attributes are used to determine whether anomalies in a second time-series signal are a cause of anomalies in a first time-series signal. The three attributes include a number of co-occurring pairs of anomalies, a precedence score (further defined below), and a delay coefficient value (further defined below).

In 350, the system detects anomalies for each of the time series signals that are provided. In 351, the system pairs together co-occurring anomalies. If an anomaly in the second signal does not have a co-occurring pair in the first signal, or vice versa, the anomaly is skipped. The pairing process may identify anomalies among the two signals that occur within a same temporal range. In 352, the system compares the number of paired anomalies to a predefined threshold. Here, the threshold may be any desired threshold set by a user or operator of the software. The threshold may be set so that enough pairs (e.g., 5 or more, etc.) are found before an anomaly precedence score is determined. If the number of anomaly pairs is below a predefined threshold, then the process may terminate and determines that there is no causal relationship in 357.

If it is determined that the ratio is above the predetermined threshold in 352, in 353 the system generates a precedence score for the two signals based on Equation 1 below:

$$\text{Precedence Score (PS)} = 2/((1/(\text{NPP}/N(Ai))) + 1/(\text{NPP}/N(Aj))))$$

Here, (i) represents the target signal and (j) represents the causal signal. In Equation 1, NPP represents the number of pairs (referred to as precedence pairs) between anomalies in the two signals, $N(Ai)$ is the count of anomalies in the target signal (i) and $N(Aj)$ is the count of anomalies in the causal signal Aj. Furthermore, in 354, the system compares the precedence score to a predetermined threshold (e.g., 90%, etc.). If the system determines the precedence score is above the predefined threshold, the system continues to step 355, otherwise, the system determines no causal relationship in 357.

If Equation 1 were applied to the signal 310 in FIG. 3A (as the target signal i) and the signal 320 in FIG. 3A (as the causal signal j), the precedence score would be as follows:

$$PS = 2/((1/(3/3))) + 1/(3/3)))) = 1.$$

In this example, PS equal to 1 means that anomaly of interest (target signal) is constantly preceded by anomaly occurrence of the causal signal when observing the past facts. PS is a statistical measure of confidence that anomaly from causal signal provokes in the near future the anomaly in the target signal. Furthermore, in this example, the signal 320 and the signal 310 have a perfect precedence score of 1 meaning that it is very likely that the anomalies in the signal 320 are the cause of the anomalies in the signal 310. Furthermore, in 354, the precedence score would be compared to the predefined threshold and would be considered above the threshold (e.g., 100% is greater than 90%, etc.) As another example, if Equation 1 were applied to the signal 310 as the target signal and the signal 330 as the causal signal, the precedence score would be as follows:

$$PS = 2/((1/(2/3))) + 1/(2/2)))) = 0.8$$

In this example, the anomalies in signal 330 may be a cause of the anomalies in the signal 320 but it would depend on whether the threshold was lower than 0.8 or 80%. If the threshold was higher (e.g., 90%), then the process would terminate with a decision indicating that no causal relationship exists.

Assuming that the system determines that the precedence score is above the predefined threshold in 354, the system determines a delay coefficient value between the paired anomalies (e.g., the anomalies in the causal signal and the corresponding paired anomalies in the target signal of interest) in 355. For example, the delay coefficient value (DCV) may be determined by dividing the standard deviation (STD) with a delay mean (DM). Referring again to the example of the two signals 320 and 310, the delay mean would be as follows:

$$DM = (14m + 13m + 16m)/3 = 14.33$$

Next, the system determines the standard deviation (STD) by subtracting the delay mean from each data point, squaring the differences, adding these, dividing by one less than the number of data points, then taking the square root which results in the following:

$$(14 - 14.33)^2 = 0.11$$

$$(13 - 14.33)^2 = 1.78$$

$$(16 - 14.33)^2 = 2.78$$

$$STD = \text{SQUARE ROOT } ((0.109 + 1.777 + 2.777)/2) = 2.33m$$

Finally, the delay coefficient value can be determined by taking the STD/DM and multiplying by 100%. Here, the DCV = $(2.33/14.33) * 100\% = 16.25\%$. DCV measures the variability of the delay between causal and resulting anomalies in a relative unit and not time unit. Next, the system determines whether the delay coefficient value is less than a threshold (e.g., 25%, etc.) in 356. If it is less than the threshold, the delay is similar enough such that there is a likely causal connection between the anomalies in the second signal and the anomalies in the target signal. Here, the system determines there is a causal connection in 358 because the system has determined that there are enough anomaly pairs, enough precedence between the pairs, and a common delay between the anomalies in the pairs. If, however, the system determines the delay coefficient is greater than the predefined threshold, the system may determine that there is no causal connection in 357.

FIG. 4 illustrates a causal model 400 identifying anomaly relationships among time-series signals in accordance with example embodiments. The causal model 400 can be used by the predictive system to predict a future occurrence of an anomaly in a target signal based on live data of other signals. Referring to FIG. 4, after finding the causal relationships between time-series signals using the process 300C described in FIG. 3C, the system can build the causal model 400 which is a graph identifying causal relationships among different time-series signals. The causal model 400 includes nodes 402 representing the different signals, and links 404 between the nodes with pointers indicating causal relationships.

In this example, anomalies within the signal S2 represented by node 412 and anomalies within the signal S4 represented by node 414 are both determined to be co-causes of anomalies in the signal S5 represented by node 416. In this example, an operator 418 may be added to the graph to indicate that both S2 and S4 anomalies must be present for the system to predict the occurrence of an anomaly in S5. As another example, the OR operator could be used to specify that only anomalies in one of these signals is needed to predict the future occurrence in the anomaly of the target signal S5. In addition, the causal model 400 may include details 420 of the signal S2 determined by the process 300C and details 430 of the signal S4 determined by the process 300C, with respect to the target signal S5. These details 420 and 430 can be extracted from the causal model 400 and displayed when outputting an alert.

Figure 5:
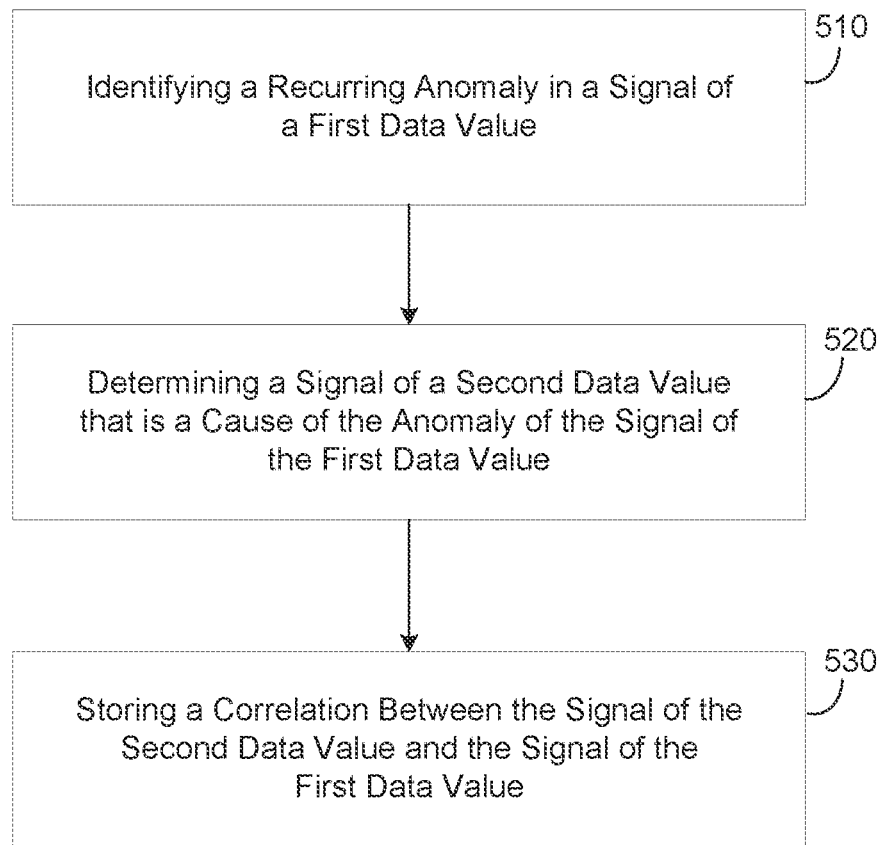
FIG. 5 is a diagram illustrating a method of determining a time-series signal is a cause of anomalies in another time-series signal in accordance with an example embodiment.

FIG. 5 illustrates a method 500 of determining a time-series signal is a cause of anomalies in another time-series signal in accordance with an example embodiment. For example, the method 500 may be executed by a database node, a cloud platform, a server, a computing system (user device), a combination of devices/nodes, or the like. Referring to FIG. 5, in 510, the method may include identifying a recurring anomaly within a time-series signal of a first data value. For example, the anomaly may be a time-series data point that has a value that exceeds other values in the time-series signal by a predefined threshold. The anomaly may represent an outlier that does not fit into the normal trend or pattern of data values.

In 520, the method may include determining a time-series signal of a second data value that is a cause of the recurring anomaly in the time-series signal of the first data value based on a preceding and co-occurring anomaly in the time-series signal of the second data value. Furthermore, in 530, the method may include storing a correlation between the preceding and co-occurring anomaly in the time-series signal of the second data value and the recurring anomaly in the time-series signal of the first data value.

Although not shown in FIG. 5, the method may further include determining, via a machine learning model, a future time-series signal of the first data value which includes future values of the first data value over time. In this example, the method may further include detecting, via the stored correlation, a future anomaly in the future signal of the first data value based on a preceding and co-occurring event detected in a new time-series signal of the second data value. Furthermore, the method may include outputting an alert (early warning) of the detected future anomaly prior to the actual occurrence of such anomaly. In other words, the method may output a warning before the anomaly happens thereby enabling a data analyst, application, or other system, to take remedial action to prevent the anomaly or make adjustments in case the anomaly occurs.

In some embodiments, the method may further include pairing anomalies in the time-series signal of the first data value with anomalies in the time-series signal of the second data value, and storing mappings of the paired anomalies within a data structure. In some embodiments, the determining may include determining the time-series signal of the second data value is the cause of the recurring anomaly in the time-series signal of the first data value when the paired anomalies are greater than a predetermined threshold. In some embodiments, the method may include identifying, for each pairing of anomalies, a delay between a respective anomaly in the time-series signal of the second data value and a paired anomaly in the time-series signal of the first data value to generate a plurality of identified delays, and storing the plurality of identified delays in the data structure in association with corresponding mappings of the paired anomalies. In some embodiments, the determining may further include determining the time-series signal of the second data value is the cause of the recurring anomaly in the time-series signal of the first data value based on the identified delays.

In some embodiments, the method may further include determining a time-series signal of a third data value that is also a cause of the recurring anomaly in the time-series signal of the first data value based on a different preceding and co-occurring anomaly in the time-series signal of the third data values. In this example, the method may further include storing a second correlation between the different preceding and co-occurring anomaly in the time-series signal of the third data value and the recurring anomaly in the time-series signal of the first data value. The correlations may be stored in a memory of the host device.

Figure 6:
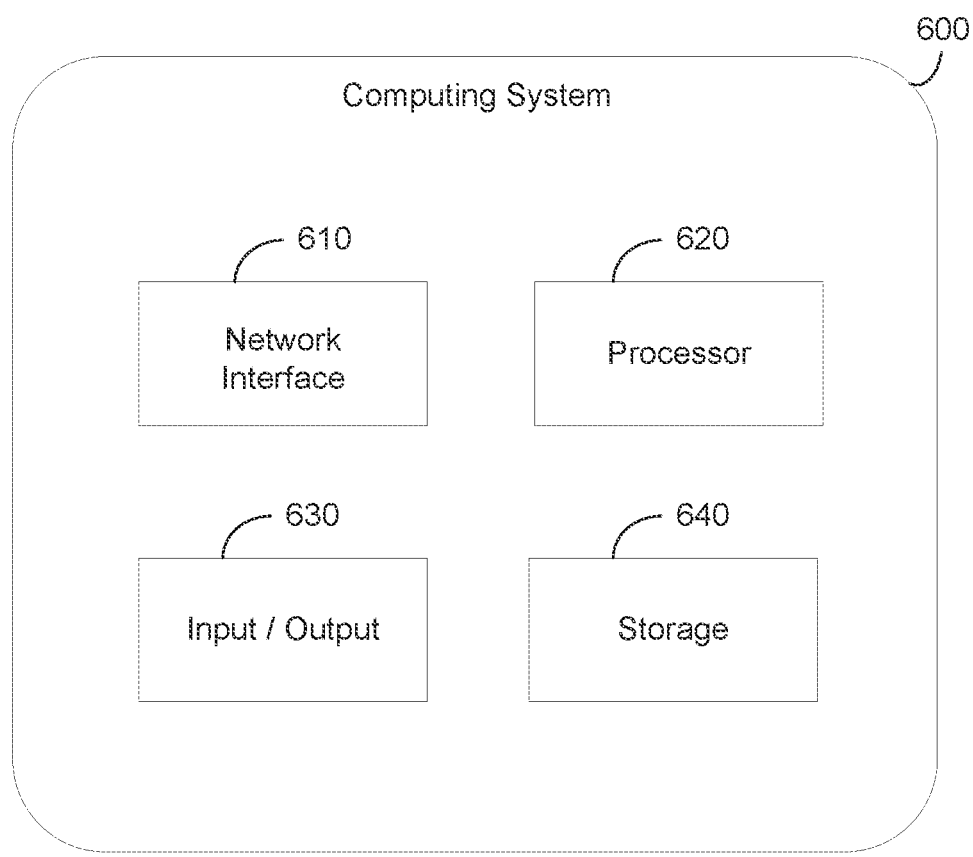
FIG. 6 is a diagram illustrating a computing system for use in the examples herein in accordance with an example embodiment.

FIG. 6 illustrates a computing system 600 that may be used in any of the methods and processes described herein, in accordance with an example embodiment. For example, the computing system 600 may be a database node, a server, a cloud platform, or the like. In some embodiments, the computing system 600 may be distributed across multiple computing devices such as multiple database nodes. Referring to FIG. 6, the computing system 600 includes a network interface 610, a processor 620, an input/output 630, and a storage device 640 such as an in-memory storage, and the like. Although not shown in FIG. 6, the computing system 600 may also include or be electronically connected to other components such as a display, an input unit(s), a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The input/output 630 may include an interface, a port, a cable, a bus, a board, a wire, and the like, for inputting and outputting data to and from the computing system 600. For example, data may be output to an embedded display of the computing system 600, an externally connected display, a display connected to the cloud, another device, and the like. The network interface 610, the input/output 630, the storage 640, or a combination thereof, may interact with applications executing on other devices.

The storage device 640 is not limited to a particular storage device and may include any known memory device such as RAM, ROM, hard disk, and the like, and may or may not be included within a database system, a cloud environment, a web server, or the like. The storage 640 may store software modules or other instructions which can be executed by the processor 620 to perform the method shown in FIG. 5. According to various embodiments, the storage 640 may include a data store having a plurality of tables, records, partitions and sub-partitions. The storage 640 may be used to store database records, documents, entries, and the like.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
    a hardware processor configured to:
        receive, by a machine learning model including a time-series forecasting model, first time-series signal captured of a first data value, a second time-series signal captured of a second data value, and a third time-series signal captured of a third data value,
        detect, by an anomaly detector, a causal relationship between a recurring anomaly in the first time-series signal and co-occurring anomalies in the second and third time series signals based on a delay in time between the recurring anomaly in the first time-series signals and the co-occurring anomalies in the second and third time-series signals,
        build, by a causal graph builder, a graph model comprising a first node representing the first time-series signal, a second node representing the second time-series signal, a third node representing the third time-series signal, an operator node between the first, second, and third nodes, and edges between the nodes identifying the causal relationship, and store the graph model in a graph data store,
        receive, by the machine learning model including the time-series forecasting model, a new time-series signal of the second data value and a new time-series signal of the third data value,
        predict, by the machine learning model including the time-series forecasting model, that a future anomaly will occur within a future time-series signal of the first data value based on a new occurrence of the co-occurring anomalies in the new time-series signals of the second and third data values and the first node, second node, third node, operator node, and edges in the graph model;
        display a graph of the future time-series signal of the first data value along a time axis within a user interface and display an indicator of the future anomaly at a future point in time on the graph of the time-series signal of the first data value corresponding to when the future anomaly will occur and a textual explanation, generated by an anomaly alerter, of the basis of the future anomaly including information regarding the co-occurring anomalies in the new time-series signals of the second and third data values; and
        transmit an alert of the predicted future anomaly, prior to an occurrence of the future anomaly, to a connected system to perform at least one of an action to prevent the anomaly and an action to make an adjustment prior to the occurrence of the predicted future anomaly.

2. The computing system of claim 1, wherein the processor is further configured to build the machine learning model based on the detected causal relationship, and detect the future anomaly in the future signal of the first data value based on an execution of the machine learning model on the new time-series signal of the first data value.

3. The computing system of claim 2, wherein the processor is further configured to output, by the anomaly alerter, an alert that warns of the detected future anomaly via the user interface.

4. The computing system of claim 1, wherein the processor is further configured to, by the machine learning model, pair recurring anomalies in the time-series signal of the first data value with anomalies in the time-series signal of the second data value, and store mappings of the paired anomalies within a data structure of the memory.

5. The computing system of claim 4, wherein the processor is configured to detect, by the anomaly detector, the causal relationship based on the paired anomalies within the data structure being greater than a predetermined threshold.

6. The computing system of claim 4, wherein the processor is further configured to identify, by the causal graph builder for each pairing of anomalies, a delay between a respective anomaly in the time-series signals of the second data value and a paired anomaly in the time-series signals of the first data value to generate a plurality of identified delays, and store the plurality of identified delays in the data structure in association with corresponding mappings of the paired anomalies.

7. The computing system of claim 6, wherein the processor is further configured to detect, by the anomaly detector, the causal relationship based on the identified delays.

8. The computing system of claim 1, wherein the processor is further configured to extract, by an anomaly extractor, data from the causal graph about past anomalies, and display the data via the user interface.

9. A method comprising:
receiving, by a machine learning model including a time-series forecasting model, first time-series signal captured of a first data value, a second time-series signal captured of a second data value, and a third time-series signal captured of a third data value;
detecting, by an anomaly detector, a causal relationship between a recurring anomaly in the first time-series signal and co-occurring anomalies in the second and third time series signals based on a delay in time between the recurring anomaly in the first time-series signals and the co-occurring anomalies in the second and third time-series signals;
building, by a causal graph builder, a graph model comprising a first node representing the first time-series signal, a second node representing the second time-series signal, a third node representing the third time-series signal, an operator node between the first, second, and third nodes, and edges between the nodes identifying the causal relationship, and storing the graph model in a graph data store;
receiving receive, by the machine learning model including the time-series forecasting model, a new time-series signal of the first data value and a new time-series signal of the second data value;
predicting, by the machine learning model including the time-series forecasting model, that a future anomaly will occur within a future time-series signal of the first data value based on a new occurrence of the co-occurring anomalies in the new time-series signal of the second and third data values and the first node, second node, third node, operator node, and edges in the graph model;
displaying a graph of the future time-series signal of the first data value along a time axis within a user interface and display an indicator of the future anomaly at a future point in time on the graph of the time-series signal of the first data value corresponding to when the future anomaly will occur and a textual explanation, generated by an anomaly alerter, of the basis of the future anomaly including information regarding the co-occurring anomalies in the new time-series signals of the second and third data values; and
transmitting an alert of the predicted future anomaly, prior to an occurrence of the future anomaly to a connected system to perform at least one of an action to prevent the anomaly and an action to make an adjustment prior to the occurrence of the predicted future anomaly.

10. The method of claim 9, further comprising:
building the machine learning model based on the detected causal relationship; and
detecting the future anomaly in the future signal of the second data value based on an execution of the machine learning model on the new time-series signal of the first data value.

11. The method of claim 10, further comprising outputting, by the anomaly alerter, an alert that warns of the detected future anomaly via the user interface.

12. The method of claim 9, further comprising:
pairing, by the machine learning model, recurring anomalies in the time-series signal of the first data value with anomalies in the time-series signal of the second data value, and storing mappings of the paired anomalies within a data structure.

13. The method of claim 12, wherein the detecting comprises detecting, by the anomaly detector, the causal relationship based on the paired anomalies stored within the data structure being greater than a predetermined threshold.

14. The method of claim 12, further comprising:
identifying, by the causal graph builder for each pairing of anomalies, a delay between a respective anomaly in the time-series signals of the second data value and a paired anomaly in the time-series signals of the first data value to generate a plurality of identified delays, and storing the plurality of identified delays in the data structure in association with corresponding mappings of the paired anomalies.

15. The method of claim 14, wherein the detecting comprises detecting, by the anomaly detector, the causal relationship based on the identified delays.

16. The method of claim 9, further comprising:
extracting, by an anomaly extractor, data from the causal graph about past anomalies, and display the data via the user interface.

17. A method comprising:
receiving, by a machine learning model including a time-series forecasting model, first time-series signal captured of a first data value, a second time-series signal captured of a second data value, and a third time-series signal captured of a third data value;
detecting, by an anomaly detector, a causal relationship between a recurring outlier in the first time-series signals and co-occurring outliers in the first and second time series signals based on a delay in time between the recurring outlier in the first time-series signal and the co-occurring outliers in the second and third time-series signals;
building, by a causal graph builder, a graph model comprising a first node representing the first time-series signal, a second node representing the second time-series signal, a third node representing the third time-series signal, an operator node between the first, second, and third nodes, and edges between the nodes identifying the causal relationship, and storing the graph model in a graph data store;
receiving, by the machine learning model including the time-series forecasting model, a new time-series signal of the first data value and a new time-series signal of the second data value;
predicting, by the machine learning model including the time-series forecasting model, that a future outlier will occur within a future time-series signal of the first data value based on a new occurrence of the co-occurring outliers in the new time-series signals of the first and second data values and the first node, second node, third node, operator node, and edges in the graph model;
displaying a graph of the future time-series signal of the first data value along a time axis within a user interface and display an indicator of the future outlier at a future point in time on the graph of the time-series signal of the first data value corresponding to when the future outlier will occur and a textual explanation, generated by an anomaly alerter, of the basis of the future anomaly including information regarding the co-occurring anomalies in the new time-series signals of the second and third data values; and
transmit an alert of the predicted future anomaly, prior to an occurrence of the future anomaly, to a connected system to perform at least one of an action to prevent the anomaly and an action to make an adjustment prior to the occurrence of the predicted future anomaly.

18. The method of claim 17, further comprising:
building the machine learning model based on the detected causal relationship, and detecting the future outlier in the future time-series signal of the second data value based on an execution of the machine learning model on the new time-series signal of the first data value.

19. The method of claim 17, further comprising:
pairing, by the machine learning model, recurring outliers in the time-series signal of the first data value with outliers in the time-series signal of the second data value, and storing mappings of the pairs within a data structure.

20. The method of claim 19, wherein the detecting comprises detecting, by the anomaly detector, the causal relationship based on the pairings stored within the data structure being greater than a predetermined threshold.

* * * * *